(12) United States Patent
Tsujimoto

(10) Patent No.: US 8,851,513 B2
(45) Date of Patent: Oct. 7, 2014

(54) AIRBAG AND AIRBAG DEVICE

(75) Inventor: Kei Tsujimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/978,831

(22) PCT Filed: Jan. 11, 2012

(86) PCT No.: PCT/JP2012/050349
§ 371 (c)(1),
(2), (4) Date: Jul. 9, 2013

(87) PCT Pub. No.: WO2012/096292
PCT Pub. Date: Jul. 19, 2012

(65) Prior Publication Data
US 2013/0292928 A1 Nov. 7, 2013

(30) Foreign Application Priority Data

Jan. 14, 2011 (JP) .................................. 2011-005443

(51) Int. Cl.
*B60R 21/16* (2006.01)

(52) U.S. Cl.
USPC ........................................................ 280/732

(58) Field of Classification Search
USPC .............................................. 280/732, 743.1
See application file for complete search history.

(56) References Cited

U.S. PATENT DOCUMENTS

| 5,306,043 | A * | 4/1994 | Mihm et al. | 280/732 |
| 8,215,665 | B2 * | 7/2012 | Ohara et al. | 280/729 |
| 8,544,881 | B2 * | 10/2013 | Abele et al. | 280/732 |
| 2012/0261910 | A1 * | 10/2012 | Fischer et al. | 280/732 |

FOREIGN PATENT DOCUMENTS

| JP | S50-108140 U | 9/1975 |
| JP | H03-52265 U | 5/1991 |
| JP | H03-281460 A | 12/1991 |
| JP | H05-262195 A | 10/1993 |
| JP | H10-044914 A | 2/1998 |
| JP | H10-071904 A | 3/1998 |
| JP | H10-071920 A | 3/1998 |
| JP | H10-203280 A | 8/1998 |
| JP | H10-203281 A | 8/1998 |
| JP | H11-115667 A | 4/1999 |
| JP | H11-139239 A | 5/1999 |
| JP | H11-139240 A | 5/1999 |
| JP | H11-170955 A | 6/1999 |
| JP | 2001-163143 A | 6/2001 |
| JP | 2001-233152 A | 8/2001 |
| JP | 2002-036996 A | 2/2002 |
| JP | 2003-320921 A | 11/2003 |
| JP | 2004-268656 A | 9/2004 |
| JP | 2008-114615 A | 5/2008 |
| JP | 2009-154778 A | 7/2009 |
| JP | 2010-221912 A | 10/2010 |

* cited by examiner

*Primary Examiner* — Faye M. Fleming
(74) *Attorney, Agent, or Firm* — Manabu Kanesaka

(57) ABSTRACT

An airbag and an airbag device allowing the airbag to stably stand by itself are provided. The airbag is usually folded and embedded in an instrument panel, and in an emergency, a gas is supplied to inflate and expand the airbag between a windshield and a passenger. Also, the airbag includes a front inflation portion inflating toward a windshield side, and a back inflation portion inflating toward a passenger side. The front inflation portion includes a bottom portion pressed against a surface of the instrument panel at a time of an inflation and expansion; and a front face portion which projects to the windshield side in a projecting shape.

8 Claims, 7 Drawing Sheets

Present Embodiment Prior Art

Present Embodiment Prior Art

AIRBAG AND AIRBAG DEVICE

RELATED APPLICATIONS

The present application is National Phase of International Application No. PCT/JP 2012/050349 filed Jan. 11, 2012, and claims priority from Japanese Application No. 2011-005443, filed Jan. 14, 2011.

FIELD OF TECHNOLOGY

The present invention relates to an airbag and an airbag device, and especially, relates to the airbag which can stand by itself, and the airbag device.

BACKGROUND ART

In a vehicle such as an automobile and the like, an airbag device, for absorbing an impact on a passenger by inflating and expanding an airbag inside a car in an emergency such as a time of a collision, a time of a rapid deceleration, and the like, becomes common to be mounted. Generally, the airbag device includes the airbag which is usually folded, and is inflated and expanded in an emergency; an inflator supplying a gas to the airbag; a retainer fixing the airbag and the inflator; and an airbag cover covering the airbag.

Then, at a time of a collision or a rapid deceleration of the vehicle, the gas is supplied to the airbag from the inflator; the airbag inflates; the airbag cover opens and bursts; and the airbag is discharged inside the car to inflate and expand. Especially, in a case of the airbag device for a front passenger seat, the airbag is inflated and expanded in a space surrounded by an instrument panel, a windshield (a front glass), and a passenger.

For example, in Patent Document 1, there is disclosed an airbag device including a case provided to he disposed inside the instrument panel in front of the front passenger seat of the automobile, and opening upward; an airbag folded and housed inside the case; an inflator which is a gas generator housed inside the case; and a rectification cloth rectifying the gas generated from the inflator. By an inflating pressure of the airbag by an actuation of the inflator, a door on an upper surface of the instrument panel is pushed open. Thereby, the airbag device is configured such that the airbag inflates and expands in the space divided by the instrument panel, the windshield, and the passenger toward a back of the vehicle. Then, in the drawings (see FIG. 3 and FIG.10) of the Patent Document 1, there is illustrated a state wherein the airbag after an inflation and expansion does not contact with the windshield, and the airbag stands by itself.

PRIOR ART DOCUMENT

Patent Document

Patent Document 1: Japanese Patent Application Publication No. 2001-163143

DISCLOSURE OF THE INVENTION

Problems to be Solved by the Invention

The conventional airbag device generally presses the airbag against the windshield, and by using a reaction force thereof, a position or an expansion behavior of the airbag is stabilized. On the other hand, as shown in the Patent Document 1, in a case wherein the airbag is attempted to stand by itself without pressing against the windshield, since the airbag largely projects to a passenger side, there has been a problem that the airbag easily falls to the passenger side, or droops. Also, since there is included a gap between the airbag and the windshield, in a case wherein an inertia force acts on the airbag at a time of a collision of the vehicle, there also has been a problem that the airbag easily sways or vibrates in a front-back direction of the vehicle. As a result, it is difficult to allow the airbag to stably stand by itself.

On the other hand, in recent years, various kinds of vehicles are developed, and an installation angle of the windshield is also designed to differ in each type of car within a range of 0° to 90°. Therefore, the current situation is that conditions such as a disposed position and a configuration of the airbag device; a dimension and a shape of the airbag, and the type of a foundation cloth; a gas pressure and a capacity of the inflator; the presence or absence and a structure of a rectification device, and the like are designed in each type of car. As a result, there has been a problem that it is difficult to reduce a cost of the airbag device or to standardize parts. Also, in a case wherein the airbag is attempted to be downsized, it is difficult to press the airbag against the windshield, and there also has been a request to allow the airbag to stand by itself without using the reaction force from the windshield.

The present invention is made in view of the aforementioned problems, and an object of the present invention is to provide an airbag and an airbag device allowing the airbag to stably stand by itself.

Means for Solving the Problems

The present invention provides an airbag folded and embedded in an instrument panel during a normal state, and in an emergency, a gas is supplied to inflate so as to self-stand between a windshield and a passenger. The airbag includes a front inflation portion inflating toward the windshield side, and a back inflation portion inflating toward the passenger side. The front inflation portion includes a bottom portion pressed against a surface of the instrument panel at a time of an inflation and expansion, and a front face portion which projects toward the windshield side in a projecting shape.

Also, the present invention provides an airbag device including the airbag folded during a normal state, and inflated and expanded in an emergency state; an inflator supplying the gas to the airbag; a retainer fixing the airbag and the inflator; and an airbag cover covering the airbag. The airbag is folded and embedded in the instrument panel during the normal state, and in an emergency state, the gas is supplied so that the airbag is inflated and expanded between the windshield and the passenger. Also, the airbag includes the front inflation portion inflating toward the windshield side, and the back inflation portion inflating toward the passenger side. The front inflation portion has the bottom portion pressed against the surface of the instrument panel at a time of an inflation and expansion, and the front face portion which projects toward the windshield side in the projecting shape.

In the airbag and the airbag device, the airbag may include an inflator opening portion; a portion on the windshield side rather than the inflator opening portion may form the front inflation portion; and a portion on the passenger side rather than the inflator opening portion may form the back inflation portion.

The front inflation portion may have a width of 15 to 100% in a front-back direction of a vehicle relative to the back inflation portion. Also, the bottom portion may have a length of 100 to 300 mm in a direction of the windshield. Also, the front face portion may have a height half of a height of the airbag or higher than a position of a gravity center of the airbag. Also, a boundary portion between the bottom portion and the front face portion may form a joint of a foundation cloth configuring the airbag. Also, the airbag may be inflated and expanded so as not to have contact with the windshield.

Moreover, the airbag may include a rectification device disposed internally and controlling a flow of the gas, and the rectification device may include a first opening portion supplying the gas to press the back inflation portion against the instrument panel on the passenger side; and a second opening portion supplying the gas to press the front inflation portion against the instrument panel on the windshield side. Also, the rectification device may include a third opening portion supplying the gas to lift the airbag upward.

EFFECT OF THE INVENTION

According to the airbag and the airbag device with respect to the aforementioned present invention, since there is formed the front inflation portion inflating toward the windshield side, the bottom portion can be pressed against the instrument panel further in front of the opening portion of the airbag so as to control a movement of the inflated and expanded airbag attempting to rotate forward. Also, there is included the front face portion projecting forward so as to control the bending or a sway (a vibration) of the airbag occurring when the airbag attempts to move or rotate forward. Therefore, according to the airbag and the airbag device with respect to the present invention, the airbag can stably stand by itself.

Also, the front inflation portion is formed based on the inflator opening portion, so that the front inflation portion including the aforementioned bottom portion and front face portion can be easily formed.

Also, the front inflation portion is formed with a predetermined width so as to effectively control the movement of the inflated and expanded airbag attempting to rotate forward. Also, the bending or the sway (the vibration) of the airbag occurring when the airbag attempts to move forward can be effectively controlled.

Also, the bottom portion is set in a predetermined length so as to effectively control the movement of the inflated and expanded airbag attempting to rotate forward.

Also, the front face portion is set in a predetermined height so as to effectively control the bending or the sway (vibration) of the airbag.

Also, the boundary portion between the bottom portion and the front face portion is made as the joint of the foundation cloth, so that the bottom portion can be easily pressed against the instrument panel.

Also, a predetermined rectification device is disposed inside the airbag, so that the front inflation portion and the back inflation portion can be efficiently inflated and expanded so as to allow the airbag to stably stand by itself.

Also, the third opening portion is formed in the rectification device so as to promptly inflate and expand the back inflation portion.

BRIEF DESCRIPTION OF THE DRAWINGS

FIGS. 2(A) and 2(B) are cross-sectional views of an airbag shown in FIG. 1, wherein FIG. 2(A) shows the first embodiment, and FIG. 2(B) shows a modified example.

FIGS. 4(A) to 4(C) are structural views of the foundation cloths of a rectification device shown in FIG. 1, wherein FIG. 4(A) shows the first embodiment; FIG. 4(B) shows the first modified example; and FIG. 4(C) shows a second modified example.

FIGS. 5(A) and 5(B) are comparison drawings showing an actuation of the airbag shown in FIG. 1, wherein FIG. 5(A) shows a case wherein an inertia force is not generated; and FIG. 5(B) shows a case wherein the inertia force is generated.

FIGS. 6(A) and 6(B) are drawings showing a second embodiment of the airbag according to the present invention, wherein FIG. 6(A) shows a cross-sectional view; and FIG. 6(B) shows a plan view of a center panel.

BEST MODES OF CARRYING OUT THE INVENTION

Figure 1:
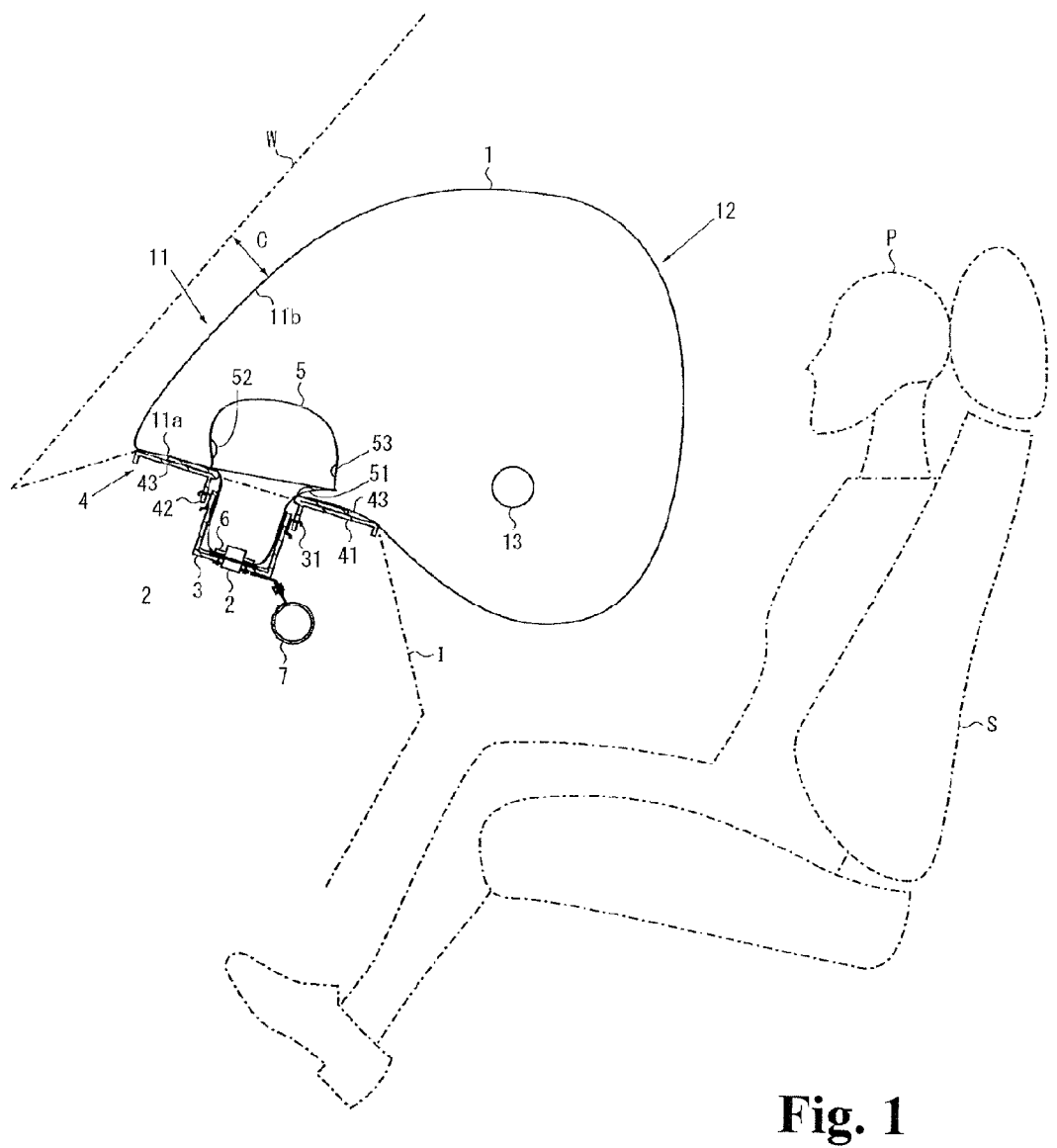
FIG. 1 is an overall structural view showing the first embodiment of an airbag device according to the present invention.
Figure 2A:
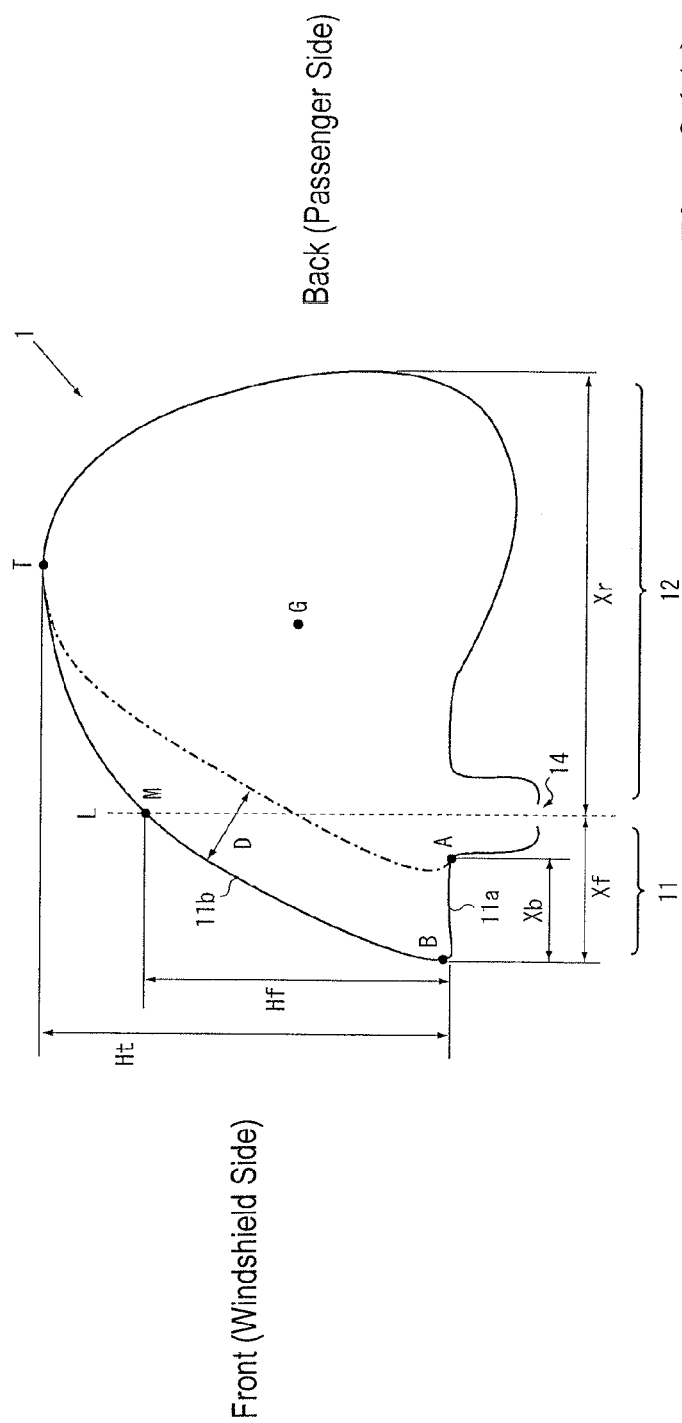
Figure 2B:
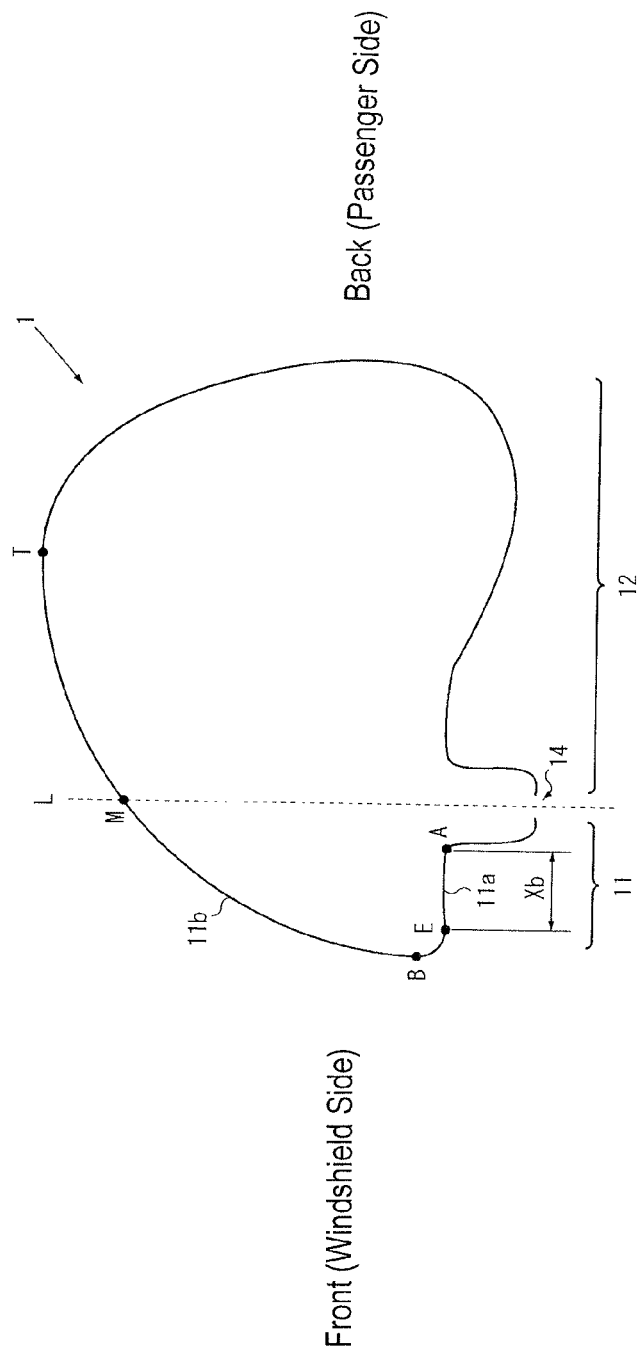

Hereinafter, embodiments of the present invention will be explained using FIGS. 1 to 6(B). Here, FIG. 1 is an overall structural view showing the first embodiment of an airbag device according to the present invention. Also, FIGS. 2(A) and 2(B) are cross-sectional views of an airbag shown in FIG. 1, wherein FIG. 2(A) shows the first embodiment; and FIG. 2(B) shows a modified example. Also, FIG. 3 is a structural view of foundation cloths of the airbag shown in FIG. 1.

Figure 3:
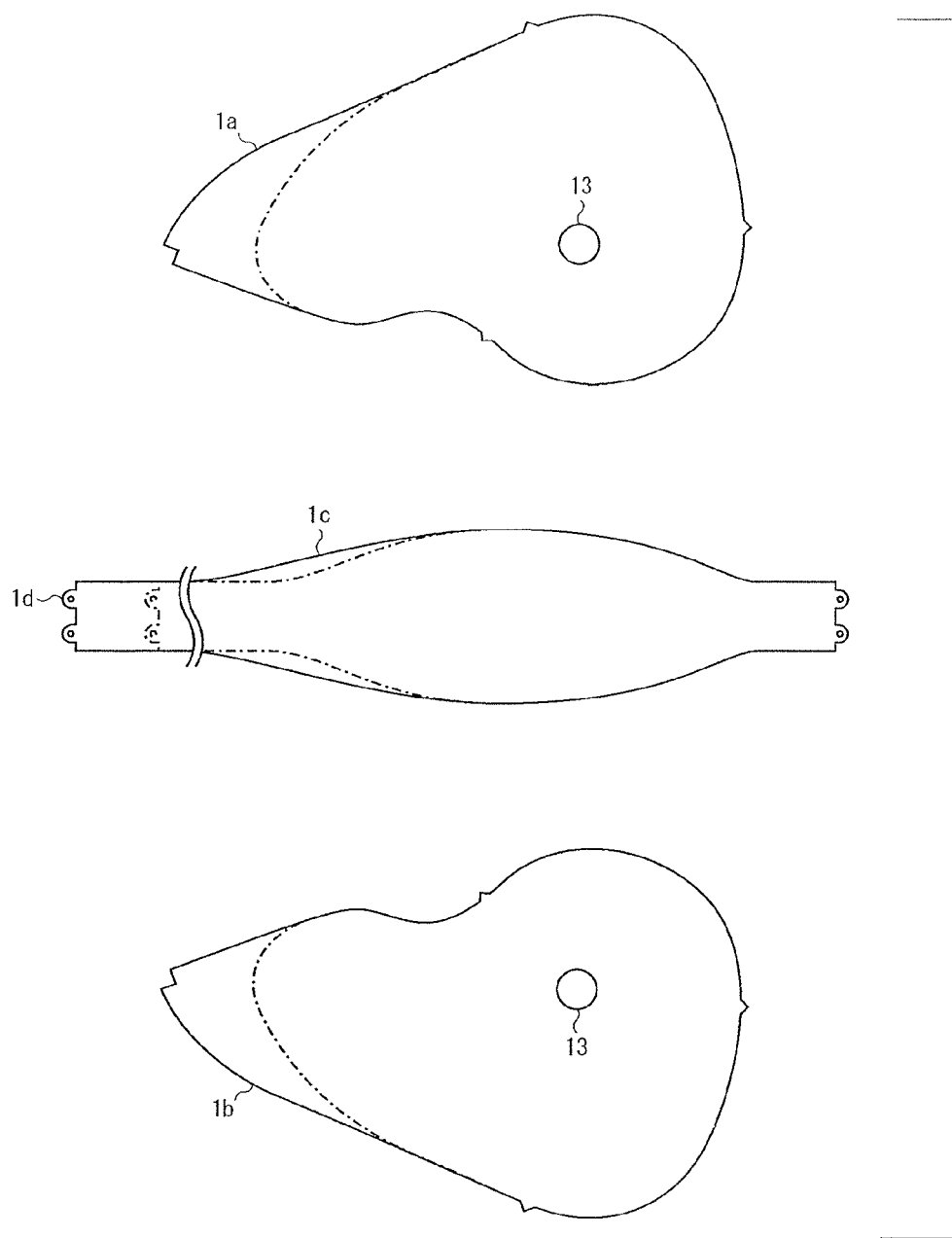
FIG. 3 is a structural view of foundation cloths of the airbag shown in FIG. 1.

As shown in FIGS. 1 to 3, the airbag device according to the first embodiment of the present invention includes an airbag 1 usually folded, and inflated and expanded in an emergency; an inflator 2 supplying a gas to the airbag 1; a retainer 3 fixing the airbag 1 and the inflator 2; and an airbag cover 4 covering the airbag 1. The airbag 1 is usually folded, and embedded in an instrument panel 1. In an emergency, the gas is supplied, and the airbag 1 is inflated and expanded between a windshield W and a passenger P. Also, the airbag 1 includes a front inflation portion 11 inflating toward a windshield W side; and a back inflation portion 12 inflating toward a passenger P side. The front inflation portion 11 includes a bottom portion 11a pressed against a surface of the instrument panel 1; and a front face portion 11b which projects to the windshield W side in a projecting shape, at a time of an inflation and expansion.

The airbag device shown in FIG. 1 is i.e., an airbag device for a front passenger seat, and the airbag 1 is inflated and expanded in a space surrounded by the passenger P seated in a seat S, the windshield W, and the instrument panel 1 so as not to have contact with the windshield W. Namely, in the airbag 1 according to the first embodiment of the present invention, a shape of the airbag 1 after an inflation and expansion is configured to have a predetermined gap C between the windshield W, and the airbag 1 is configured to be capable of standing by itself without using a reaction force from the windshield W. In the airbag 1, when the passenger P has contact with the airbag 1, there may be formed a vent hole 13 exhausting the gas inside the airbag 1 and absorbing an impact.

Incidentally, here, the phrase "the airbag 1 stands by itself" means that as shown in the figures, it is not only limited to a case wherein the airbag 1 after an inflation and expansion has the predetermined gap C between the windshield W, but also there is included a case wherein the reaction force from the windshield W is small even in a case wherein the airbag 1 is in contact with the windshield W, and the airbag 1 substantially stands by itself.

Also, in FIG. 1, although a state after an inflation and expansion of the airbag 1 is shown, in a state before the inflation and expansion of the airbag 1, a surface of the airbag cover 4 configures one portion of the instrument panel 1 (not shown in the figure). Also, as shown in FIG. 1, the airbag cover 4 includes a plate-like portion 41 configuring a vehicle interior face, and an inner case 42 disposed on a back face of the plate-like portion 41 and configuring an inflation-expansion path for the airbag 1. In the plate-like portion 41, there is formed a door portion 43 formed to be capable of opening and bursting at a time of an inflation and expansion of the airbag 1. Incidentally, regarding a configuration of the airbag cover 4, it is not limited to the configuration shown in the figure, and a conventionally-used configuration can be selectively used appropriately.

The inflator 2 has an external shape with approximately a cylinder shape, and there is formed a gas jetting port on a side peripheral face of a tip portion included in the airbag 1. Such inflator 2 is fitted into an opening portion formed in the retainer 3 and is fixed to the retainer 3 by a fixing device 6 such as a buckling and the like. Also, the inflator 2 is connected to an ECU (an electronic control unit) which is not shown in the figure, and is controlled based on a measurement value such as an acceleration sensor and the like. In an emergency such that the ECU has detected or predicted a collision or a rapid deceleration of a vehicle, the inflator 2 is ignited by a lighting current from the ECU; burns a medical agent stored inside the inflator 2; generates a gas; and supplies the gas to the airbag 1 through a rectification device 5. Incidentally, a shape or a fixation method of the inflator is not limited to the one shown in the figure, and a conventionally-used one can be selectively used appropriately.

As shown in FIG. 1, the retainer 3 is locked in a locking hole formed in the inner case 42 by a hook 31 connected to a side face portion, and is coupled to an in-car structural object 7 through a connecting member. Incidentally, regarding the retainer 3 and a coupling structure thereof, it is not limited to the retainer 3 and the coupling structure shown in the figure, and a conventionally-used retainer and coupling structure can be selectively used appropriately.

Here, a shape of the airbag 1 according to the first embodiment shown in FIG. 1 will be explained with reference to FIGS. 2(A) and 2(B). Incidentally, in FIG. 2(A), a portion shown by dashed-dotted lines shows the shape of the airbag in a prior art.

As shown in FIG. 2(A), the airbag 1 includes an inflator opening portion 14; a portion on the windshield W side rather than the inflator opening portion 14 configures the front inflation portion 11; and a portion on the passenger P side rather than the inflator opening portion 14 configures the hack inflation portion 12. Namely, the airbag 1 may be divided in two back and forth by a center line L of the inflator opening portion 14 so that a front side is the front inflation portion 11, and a back side is the back inflation portion 12. The front inflation portion 11 has, for example, a width Xf in a front-back direction of the vehicle, and the back inflation portion 12 has, for example, a width Xr in the front-back direction of the vehicle.

The width Xf of the front inflation portion 11 has, for example, a dimension of 15 to 100% relative to the width Xr of the back :inflation portion 12. For example, in a case wherein the width Xr of the back inflation portion 12 is 300 mm, the width Xf of the front inflation portion 11 is set in 100 mm (approximately 33%), 150 mm (50%), 200 mm (approximately 67%), 250 mm (approximately 83%), 300 mm (100%), and the like. Also, in a case wherein the width Xr of the back inflation portion 12 is 450 mm, the width Xf of the front inflation portion 11 is set in, for example, 100 mm (approximately 22%), 150 mm (approximately 33%), 200 mm (approximately 44%), 250 mm (approximately 56%), 300 mm (approximately 67%), and the like. Also, in a case wherein the width Xr of the back inflation portion 12 is 600 mm, the width Xf of the front inflation portion 11 is set in, for example, 100 mm (approximately 17%), 150 mm (25%), 200 mm (approximately 33%), 250 mm (approximately 42%), 300 mm (50%), and the like.

Incidentally, here, although the cases wherein the width Xr of the back inflation portion 12 is 300 mm, 450 mm, and 600 mm are illustrated by examples, they are not limited to such numerical values, and can be set in an arbitrary numerical value depending on a condition such as the type of car, an installation location, and the like. Also, although the width Xf of the front inflation portion 11 is illustrated by examples with 50 mm increments in between within a range of 100 mm to 300 mm, the width Xf of the front inflation portion 11 is not limited to such numerical values, and can be set in an arbitrary numerical value depending on a condition such as the type of car, the installation location, a capacity of the airbag 1, the width Xr of the back inflation portion 12, and the like within a range of 15 to 100%, preferably within a range of 30 to 50% relative to the width Xr of the back inflation portion 12.

As shown in FIG. 2(A), in a conventional airbag, a width of a portion corresponding to the front inflation portion 11 is very narrow, and does not have a sufficient width relative to the width Xr of the back inflation portion 12. Namely, the conventional airbag substantively does not include the front inflation portion 11, and does not include the bottom portion 11a pressed against the surface of the instrument panel 1, and the front face portion 11b which projects to the windshield W side in the projecting shape.

The bottom portion 11a of the front inflation portion 11 is a portion pressed toward the surface of the instrument panel 1. Namely, for example, as shown in FIG. 1, the bottom portion 11a is pressed against the surface of the instrument panel 1 through the door portion 43, which is open and burst at a time of an inflation and expansion, of the airbag cover 4. Also, as shown in FIG. 2(A), in a case wherein a contact point between the inflated and expanded airbag 1 and an opening portion of the instrument panel 1 is a base point A, and wherein a nearest portion to the windshield W of the front inflation portion 11 is a most-front end point B, the bottom portion 11a is set in a range between the base point A and the most-front end point B.

Regarding a cross-sectional shape of the bottom portion 11a at a time of an inflation and expansion, since the bottom portion 11a is pressed toward the surface of the instrument panel 1, a most part of the cross-sectional shape of the bottom portion 11a at a time of an inflation and expansion has a shape (for example, approximately a linear shape) along a surface shape of the instrument panel 1. However, in a vicinity of the most-front end point B, there is configured a transition portion relative to the front face portion 11b, so that the cross-sectional shape of the bottom portion 11a may be formed to be separated from the surface of the instrument panel 1. For example, in the modified example shown in FIG. 2(B), a portion between the base point A and an intermediate point E is formed in a shape (for example, approximately the linear shape) along the surface shape of the instrument panel 1, and a portion between the intermediate point E and the most-front end point B is formed to have an arc shape.

A length Xb of the bottom portion 11a is defined by an interval between the base point A and the most-front end point B in the front-back direction of the vehicle. Also, from a functional perspective of the bottom portion 11a which is pressed against the surface of the instrument panel 1, the length Xb of the bottom portion 11a may be defined by an interval between the base point A and the intermediate point E in the front-back direction of the vehicle as well. For example, the length Xb of the bottom portion 11a is set within a range of 100 to 300 mm in a windshield W direction. Regarding the length Xb of the bottom portion 11a, the width Xf of the front inflation portion 11 is set to be within the range of 15 to 100%, preferably within the range of 30 to 50% relative to the width Xr of the back inflation portion 12. However, the length Xb of the bottom portion 11a is not limited to such numerical values, and can be set in an arbitrary numerical value depending on a condition such as the surface shape of the instrument panel 1; an interval between the instrument panel 1 and the windshield W; the shape, the capacity, and an inner pressure of the airbag 1; a dimension of an inertia force generated in the airbag 1, and the like.

As shown in FIG. 1, the front face portion 11b of the front inflation portion 11 inflates and expands to have the predetermined gap C between the windshield W, and is a portion which projects to the windshield W side in the projecting shape. As shown in FIG. 2(A), in a case wherein an upmost end point of the inflated and expanded airbag 1 is a top point T, and an intersection point between the center line L and the airbag 1 is an intermediate point M, the front face portion 11b is set within a range between the most-front end point B and the intermediate point M. Incidentally, a range between the intermediate point M and the top point T can be considered as a transition portion from the front inflation portion 11 to the back inflation portion 12.

In a case wherein an inertia force based on a collision of the vehicle and the like acts on the airbag 1 after an inflation and expansion, the airbag 1 attempts to move forward (the windshield W side). At that time, in FIG. 2(A), in the conventional airbag shown by the dashed-dotted lines, in a case of assuming that a volume of a front portion rather than the center line L is small, and that there is no windshield W, the conventional airbag easily bends forward within a range between the base point A and the top point T. On the other hand, in the present embodiment, by forming the front inflation portion 11, the volume of the front (the windshield W side) portion rather than the center line L can be increased. Therefore, the front inflation portion 11 functions as a stopper by catching the surface of the instrument panel 1 by the bottom portion 11a, and to withstand a load thereof, the front face portion 11b is formed to project to the windshield W side in the projecting shape. Namely, the front inflation portion 11 having a predetermined inner pressure after an inflation and expansion configures a kind of rigid body, and abuts against the surface of the instrument panel 1 so as to control a rotation of the airbag 1 toward the windshield W side, and to control a movement of the back inflation portion 12 attempting to move or rotate toward the windshield W side.

As shown in FIG. 2(A), a cross-sectional shape of the front face portion 11b at a time of an inflation and expansion is formed approximately in an arc shape. For example, in the modified example shown in FIG. 2(B), a portion between the most-front end point B and the top point T is formed to have an arc shape having the same curvature. However, the cross-sectional shape of the front face portion 11b is not limited to the ones shown in the figures, and a difference D between a degree of the projecting shape and the conventional airbag can be set in an arbitrary shape depending on a condition such as the interval between the instrument panel 1 and the windshield W; a slope angle of the windshield W; the shape, the capacity, and the inner pressure of the airbag 1; the dimension of the inertia force generated in the airbag 1, and the like.

Also, in a case wherein a height (for example, an interval between the bottom portion 11a and the top point T) of the airbag 1 is Ht; a height (for example, an interval between the bottom portion 11a and the intermediate point M) of the front face portion 11b is Hf; and a gravity center of the airbag 1 is G, the height Hf of the front face portion 11b is set, for example, higher than a half of the height Ht of the airbag 1. Also, the height Hf of the front face portion 11b may be set higher than a position of the gravity center G of the airbag 1. The height Hf of the front face portion 11b is set as above so as to effectively control a movement of the airbag 1 attempting to move or rotate forward, and to control the bending of the airbag 1 as well. Incidentally, when the gravity center G of the airbag 1 is set, only a portion discharged inside a car in a state of inflation and expansion may be considered. In other words, in the state of inflation and expansion, the gravity center G may be set while excluding a portion included inside the instrument panel 1.

Incidentally, by forming the front inflation portion 11 in the airbag 1, the capacity of the airbag 1 increases. However, in a case wherein the capacity of the airbag 1 is not desired to increase, a side width (i.e., a width in a short-side direction of a center panel 1c) of the airbag 1 is narrowed so as to easily adjust the capacity of the airbag 1.

Next, a foundation cloth configuration of the airbag 1 will be explained with reference to FIG. 3. Incidentally, in FIG. 3, portions shown by dashed-dotted lines show shapes of the foundation cloths of the airbag in the prior art.

As shown in FIG. 3, the airbag 1 is configured by, for example, a right-and-left pair of side panels 1a and 1b, and a center panel 1c coupling the side panels 1a and 1b. Side face portions of the center panel 1c in a long-side direction, and outer edge portions of the side panels 1a and 1b are sewn together to form the airbag 1 which is a bag body. A plurality of projecting portions 1d formed in the short-side direction of the center panel 1c respectively includes an engagement hole, and is configured to be engageable with the fixing device 6 (see FIG. 1) fixing the inflator 2. Incidentally, in a case wherein the airbag 1 includes the vent hole 13, the vent hole 13 may be formed in the side panels 1a and 1b.

In FIG. 3, a case wherein the airbag 1 is formed by three panels (the foundation cloths) of the side panels 1a and 1b and the center panel 1c has been explained. However, the airbag 1 is not limited to such configuration, and may be formed by a configuration similar to the conventional airbag such that the side panels 1a and 1b or the center panel 1c are further divided and sewn together; the airbag 1 is divided back and forth; and the like.

Also, as shown in FIG. 1, the airbag 1 includes the rectification device 5 disposed internally and controlling a flow of a gas. The rectification device 5 includes a first opening portion 51 supplying the gas to press the back inflation portion 12 against the instrument panel 1 on the passenger P side; and a second opening portion 52 supplying the gas to press the front inflation portion 11 against the instrument panel 1 on the windshield W side. Moreover, the rectification device 5 may include a third opening portion 53 supplying the gas to lift the airbag 1 upward.

Figure 4A:
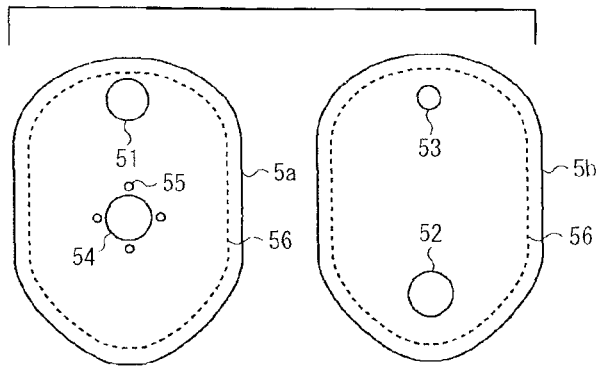
Figure 4B:
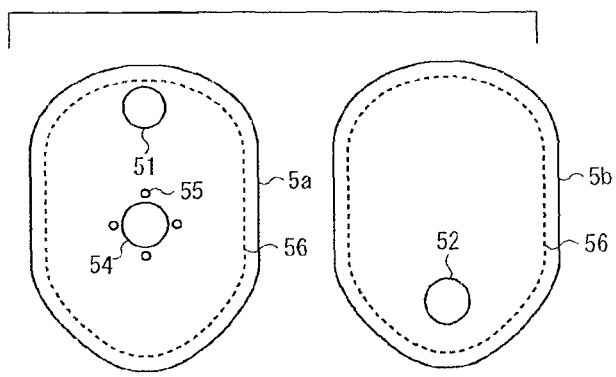
Figure 4C:
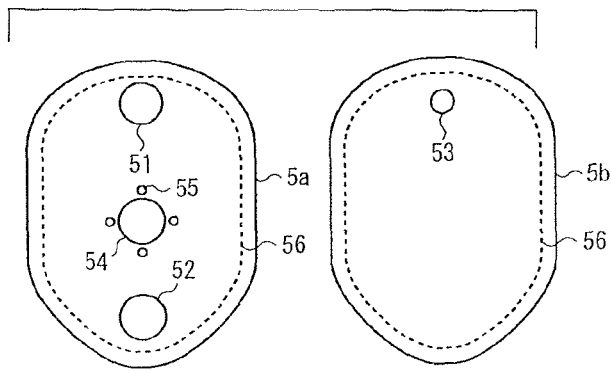

Here, the rectification device 5 will be explained with reference to FIGS. 4(A), 4(R), and 4(C). FIGS. 4(A) and 4(B) are structural views of the foundation cloths of the rectification device shown in FIG. 1; FIG. 4(A) shows the first embodiment; FIG. 4(B) shows the first modified example; and FIG. 4(C) shows a second modified example.

As shown in FIG. 4(A), the rectification device 5 is configured by, for example, a first panel 5a fixed to the retainer 3, and a second panel 5b connected to the first panel 5a. The first panel 5a includes the first opening portion 51; an inflator opening portion 54 wherein the inflator 2 is inserted and passed through; and a plurality of engagement holes 55 disposed on an outer circumference of the inflator opening portion 54, and wherein the fixing device 6 to the retainer 3 is inserted and passed through. Also, the second panel 5b includes the second opening portion 52 and the third opening portion 53. Such first panel 5a and second panel 5b are overlapped and sewn together along sewing lines 56 to configure the rectification device 5. Such rectification device 5 also may be called an inner bag, a diffuser, a small chamber, and the like.

Incidentally, although it is not shown in the figures, the panels configuring the rectification device 5 are not limited to a combination of the first panel 5a and the second panel 5b shown in the figures, and either one of the first panel 5a or the second panel 5b may be formed larger than the other of the first panel 5a or the second panel 5b; the panels may be one sheet of panel formed in a bag shape in three dimensions; or the panels may be divided into three or more sheets to be sewn together.

Also, the first opening portion 51, the second opening portion 52, and the third opening portion 53 may he formed to have a relationship that an opening area is the first opening portion 51≥the second opening portion 52>the third opening portion 53. By setting a dimension of the opening area in such a manner, a gas can be effectively supplied to the front inflation portion 11 and the back inflation portion 12; the airbag 1 can be effectively lifted upward; and the airbag 1 can be efficiently inflated and expanded.

Incidentally, the fixing device 6 of the rectification device 5 is the buckling fixing the rectification device 5 and the airbag 1 to the retainer 3 housing the airbag 1. The buckling includes a fixing bolt which is inserted and passed through the rectification device 5 and the airbag 1. The buckling is a pressing plate including an opening portion wherein the inflator 2 can be inserted and passed through, and sandwiching the rectification device 5 and the airbag 1 between the retainer 3. The fixing bolt may be a separate part from the buckling, and may be configured by a leg portion provided to stand up on an outer circumferential portion of the buckling. Between the fixing device 6 and the retainer 3, the airbag 1 and the rectification device 5 are inserted and passed through the fixing bolt of the fixing device 6 from above in order of a reinforcement patch; the rectification device 5; the airbag 1; and a flange portion of the inflator 2, and a nut is screwed together from a retainer 3 side, so that the airbag 1 and the rectification device 5 are fixed to the retainer 3. Incidentally, the reinforcement patch may be omitted as necessary; the number of the reinforcement patch may be increased; or a sandwiching portion may be modified.

By disposing the aforementioned rectification device 5 inside the airbag 1, the front inflation portion 11 and the back inflation portion 12 can be efficiently inflated and expanded, and the airbag 1 can stably stand by itself. Also, in a case wherein the third opening portion 53 is formed in the rectification device 5, the back inflation portion 12 can be promptly inflated and expanded. Also, by allowing the airbag 1 to stably stand by itself, regardless of an installation angle of the windshield W or the type of car, the airbag 1 and parts of the airbag device can be standardized, and eventually, costs of the airbag 1 and the airbag device can be reduced.

Next, the modified examples of the rectification device 5 will be explained. In the first modified example shown in FIG. 4(B), the third opening portion 53 is omitted. In a case wherein a gas allowing the airbag 1 to inflate and expand can be sufficiently supplied by the first opening portion 51 and the second opening portion 52, the third opening portion 53 may be omitted. Conversely, in a case wherein the gas allowing the airbag 1 to inflate and expand is not sufficiently supplied by the first opening portion 51 and the second opening portion 52, although it is not shown in the figures, there may be formed a plurality of the third opening portion 53.

Also, in the second modified example shown in FIG. 4(C), the second opening portion 52 is formed in the first panel 5a. Depending on a disposing method of the airbag 1 to the instrument panel 1, the first opening portion 51 and the second opening portion 52 are formed in either the first panel 5a or the second panel 5b to allow the gas to be supplied to a predetermined position of the airbag 1.

Figure 5A:
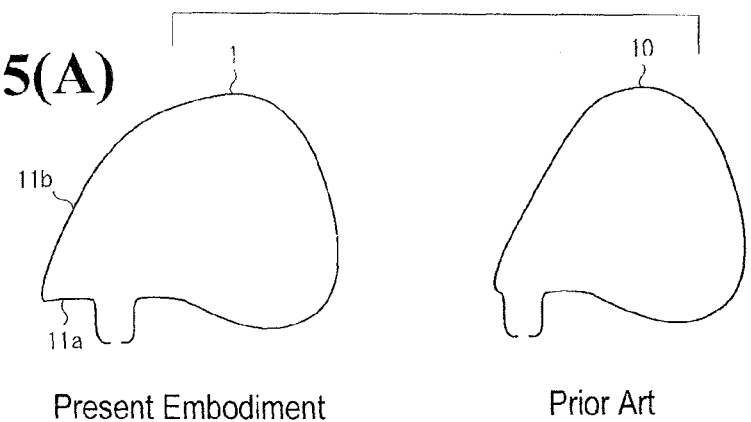
Figure 5B:
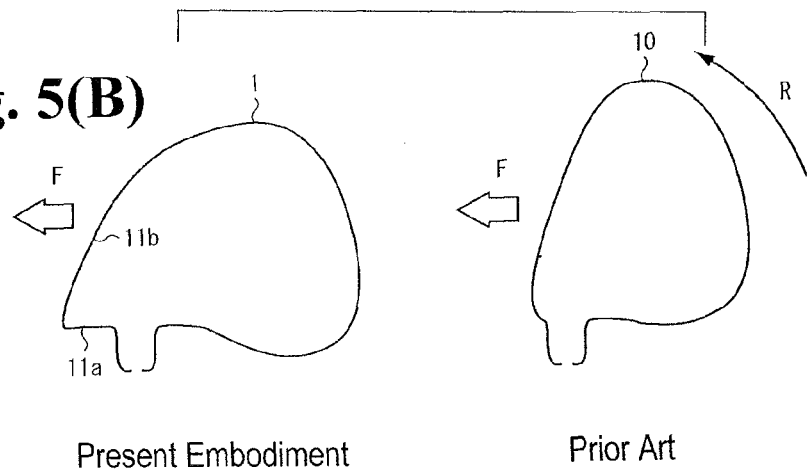

Here, an actuation of the aforementioned airbag 1 will be explained with reference to FIGS. 5(A) and 5(B). FIGS. 5(A) and 5(B) are comparison drawings showing the actuation of the airbag shown in FIG. 1, wherein FIG. 5(A) shows a case where an inertia force is not generated; and FIG. 5(B) shows a case Where the inertia force is generated. Incidentally, in each figure, parts (the rectification device 5, the inflator 2, the instrument panel 1, and the like) except for the airbag 1 are omitted for the sake of explanation.

As shown in FIG. 5(A), in a case wherein an inertia force F does not act at a time of an inflation and expansion of the airbag 1 according to the present embodiment and an airbag in the prior art, the airbags 1 and 10 are inflated and expanded in a shape and a position as previously arranged.

On the other hand, in a case wherein the inertia force F acts at a time of an inflation and expansion of the airbags 1 and 10, as shown in FIG. 5(B), since the airbag 10 in the prior art does not include the front inflation portion 11, the airbag 10 attempts to move forward, and attempts to rotate forward as a base point of a fixing portion of the airbag 10. In a case wherein there is the windshield W, the airbag 10 is pressed against the windshield W so as to block a rotation.

In a case of the airbag 10 which includes the gap C between the windshield W, and is a self-standing type, the airbag 10 moves or rotates only for at least the gap C so as to be out of alignment from a previously-arranged inflated and expanded position of the airbag 10. Alternatively, the airbag 10 collides against the windshield W and bounces back so as to sway (vibrate) in the front-back direction of the vehicle. Incidentally, in a case wherein there is no windshield W, the airbag 10 rotates forward further, and in some cases, the airbag 10 is bent forward.

By contrast, since the airbag 1 according to the present embodiment includes the front inflation portion 11, the bottom portion 11a of the front inflation portion 11 is pressed against the instrument panel 1 so as to control the movement of the airbag 1 attempting to rotate forward. Also, the front inflation portion 11 includes the front face portion 11b projecting forward so as to form a kind of rigid body, and a forward movement or rotation of the airbag 1 is controlled. Moreover, even in the case wherein there is no windshield W, the forward bending of the airbag 1 is controlled. Therefore, as shown in FIG. 5(B), according to the airbag 1 with respect to the present embodiment, even in the case wherein the inertia force F acts at a time of an inflation and expansion, substantively the same position as the case wherein the inertia force F does not act can be maintained so as to allow the airbag 1 to stably stand by itself.

Figure 6A:
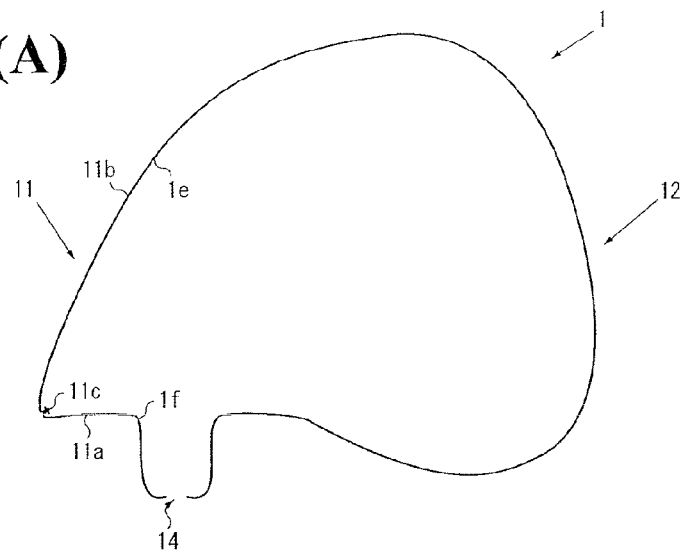
Figure 6B:
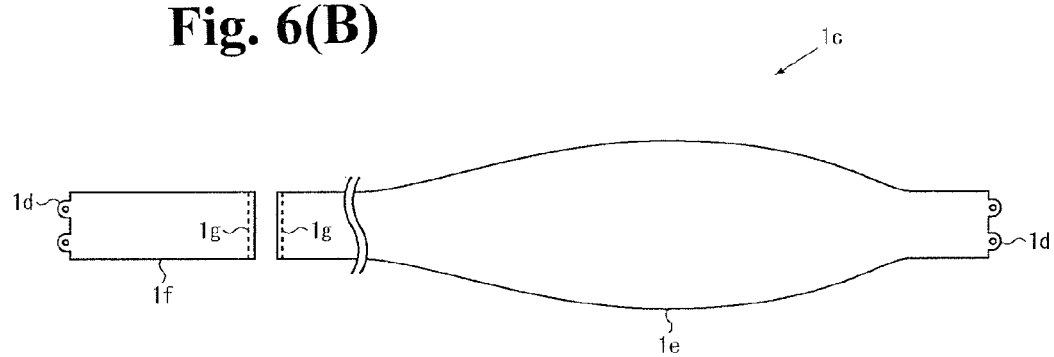

Finally, other embodiments of the airbag 1 will be explained. Here, FIGS. 6(A) and 6(B) are drawings showing a second embodiment of the airbag according to the present invention, wherein FIG. 6(A) shows a cross-sectional view; and FIG. 6(B) shows a plan view of the center panel. Incidentally, configuration parts same as those in the airbag 1 according to the first embodiment are designated by the same reference numerals and explanations thereof are omitted. Also, in FIG. 6(A), parts (the rectification device 5, the inflator 2, the instrument panel 1, and the like) except for the airbag 1 are omitted for the sake of explanation.

In the airbag 1 according to the second embodiment shown in FIG. 6(A), a boundary portion 11c between the bottom portion 11a and the front face portion 11b of the front inflation portion 11 forms a joint of the panels (the foundation cloths) configuring the airbag 1. For example, as shown in FIG. 6(B), the center panel 1c is divided into a first center panel 1e and a second center panel 1f. The first center panel 1e configures a portion from the back inflation portion 12 to the front face portion 11b of the front inflation portion 11, and the second center panel 1f configures a portion of the bottom portion 11a of the front inflation portion 11. The first center panel 1e and the second center panel 1f are sewn together at a portion of sewing lines 1g, and the sewing portion configures the boundary portion 11c.

A configuration of such second embodiment not only provides an effect similar to the airbag 1 according to the first embodiment, but also can form the bottom portion 11a in a shape which can be easily pressed against the instrument panel 1, and a functional share between the bottom portion 11a and the front face portion 11b can be clarified. Also, a transition portion from the bottom portion 11a to the front face portion 11b can be shortened, and even if the configuration of the second embodiment has the same dimension as the airbag 1 according to the first embodiment, portions of the bottom portion 11a and the front face portion 11b can be lengthened.

As for the embodiments of the airbag device according to the present invention, although the examples of the airbag device for a front passenger seat have been explained, the present invention can also be applied to an airbag device wherein the airbag 1 is inflated and expanded using a reaction force of the windshield W (including a front glass and a rear glass), for example, an airbag device for a driver's seat, an airbag device for a backseat, and the like.

The present invention is not limited to the aforementioned embodiments, and the airbag 1 may be divided in two back and forth by a straight line passing through a center point of the inflator opening portion 14 and the top point T so that the front inflation portion 11 and the back inflation portion 12 may be separated. Obviously, the present invention can be variously modified provided that it does not exceed the subject of the present invention, such as that the rectification device 5 shown in FIGS. 4(A) to 4(C) can be applied to the airbag 1 according to the second embodiment, and the like.

EXPLANATION OF SYMBOLS

1 . . . an airbag
2 . . . an inflator
3 . . . a retainer
4 . . . an airbag cover
5 . . . a rectification device
6 . . . a fixing device
7 . . . an in-car structural object
11 . . . a front inflation portion
11a . . . a bottom portion
11b . . . a front face portion
11c . . . a boundary portion
12 . . . a back inflation portion
14 . . . an inflator opening portion
51 . . . a first opening portion
52 . . . a second opening portion
53 . . . a third opening portion

What is claimed is:

1. An airbag folded and embedded in an instrument panel during a normal state, and supplied with a gas to inflate so as to self-stand between a windshield and a passenger in an emergency state, comprising:
a front inflation portion inflating toward a windshield side;
a back inflation portion inflating toward a passenger side; and
a rectification device disposed internally and controlling a gas flow, including a first opening portion supplying the gas to press the back inflation portion against the instrument panel on the passenger side, a second opening portion supplying the gas to press the front inflation portion against the instrument panel on the windshield side, and a third opening portion supplying the gas to lift the airbag upward,
wherein the front inflation portion includes a bottom portion pressed against a surface of the instrument panel at a time of an inflation, and a front face portion which projects toward the windshield side in a projecting shape, and
the front face portion has a height half of a height of the airbag or higher than a position of a gravity center of the airbag.

2. An airbag according to claim 1, further comprising an inflator opening portion,
wherein a portion on the windshield side rather than the inflator opening portion forms the front inflation portion, and
a portion on the passenger side rather than the inflator opening portion forms the back inflation portion.

3. An airbag according to claim 1, wherein the front inflation portion has a width of 15 to 100% in a front-back direction of a vehicle relative to the back inflation portion.

4. An airbag according to claim 1, wherein the bottom portion has a length of 100 to 300 mm in a direction of the windshield.

5. An airbag according to claim 1, wherein a boundary portion between the bottom portion and the front face portion forms a joint of a foundation cloth forming the airbag.

6. An airbag according to claim 1, wherein the airbag inflates so as not to contact with the windshield.

7. An airbag device, comprising:
an airbag folded during a normal state, and inflated and expanded in an emergency state;
an inflator supplying a gas to the airbag;
a retainer fixing the airbag and the inflator; and
an airbag cover covering the airbag,
wherein the airbag is the airbag according to claim 1.

8. An airbag folded and embedded in an instrument panel during a normal state, and supplied with a gas to inflate so as to self-stand between a windshield and a passenger in an emergency state, comprising:
a front inflation portion inflating toward a windshield side; and
a back inflation portion inflating toward a passenger side,
wherein the front inflation portion includes a bottom portion pressed against a surface of the instrument panel at a time of an inflation, and a front face portion which projects toward the windshield side in a projecting shape,
the front face portion has a height half of a height of the airbag or higher than a position of a gravity center of the airbag, and
the airbag inflates so as not to contact with the windshield.

* * * * *